Sept. 20, 1966 K. HINRICHS 3,274,379

DIGITAL DATA CORRELATOR

Filed April 15, 1963 3 Sheets-Sheet 1

INVENTOR
KARL HINRICHS
By FOWLER & KNOBBE
ATTORNEYS

Sept. 20, 1966 K. HINRICHS 3,274,379

DIGITAL DATA CORRELATOR

Filed April 15, 1963 3 Sheets-Sheet 2

INVENTOR
KARL HINRICHS
By FOWLER & KNOBBE
ATTORNEYS

Sept. 20, 1966 K. HINRICHS 3,274,379

DIGITAL DATA CORRELATOR

Filed April 15, 1963 3 Sheets-Sheet 3

INVENTOR
KARL HINRICHS
BY FOWLER & KNOBBE
ATTORNEYS

United States Patent Office 3,274,379
Patented Sept. 20, 1966

3,274,379
DIGITAL DATA CORRELATOR
Karl Hinrichs, Fullerton, Calif., assignor to Beckman Instruments, Inc., a corporation of California
Filed Apr. 15, 1963, Ser. No. 273,010
18 Claims. (Cl. 235—177)

The present invention relates to an improved system for correlating digital data and, more particularly, to a system for determining the degree of correlation between a preset code of $n$ bits and every $n$-bit group in a stream of digital data.

Systems for receiving digitally encoded data require a means for adjusting the frequency of the local clock to that of the incoming bit stream and adjusting the bit phase of the local decommutation equipment to that of the incoming bit stream. A preferred apparatus for maintaining the local clock in synchronization with the received signal is described and claimed in the copending application of H. C. Bertuccelli et al. entitled "Pulse Code Modulation Reception System," Serial No. 273,007, filed concurrently herewith, and assigned to Beckman Instruments, Inc., assignee of the present invention.

It is the object of the present invention to provide an improved correlator system for determining the bit phase of the received digital data. A particular feature of this invention is that it permits a substantially continuous correlation of the received data under heavy noise conditions.

Other and further objects, features and advantages of the invention will become apparent as the description proceeds.

Briefly, in accordance with a preferred form of the present invention, there is provided means for examining each group of $n$ bits in the received bit stream for correlation with a group of $n$ bits corresponding to a predetermined code pattern. Each frame of originally transmitted data contains an $n$ group of bits corresponding to this coded pattern. Accordingly, assuming no change in the code during transmission and reception, the correlator should indicate one and only one correlation for each frame of data. The particular clock period in which this correlation is detected can then be utilized to adjust the phase of the decommutation equipment to that of the incoming data.

However, in normal practice, the assumption that the transmitted and received codes will always be identical is not valid, primarily because of the effects of noise upon the transmitted data. Also, there is the possibility of operator error in setting up either or both the transmitted code pattern and the code pattern preset in the data correlator. Accordingly, a compromise must be made and a certain number of conflicts between the data and code bit groups permitted. This predetermined conflict level is that which gives the maximum rejection of correlations in erroneous locations under normal noise conditions. This conflict level, however, will be exceeded when there is an excessive noise condition. A significant feature of the present invention is that it not only monitors all patterns for correlations above this stringent conflict level but also for correlations above a less stringent secondary conflict level set to provide a more liberal conflict acceptance level. Thus, even though the actual conflict level exceeds the primary conflict level, if a satisfactory correlation is shown by the secondary level, the decommutation of the data can continue without interruption. As a result, the present invention provides both maximum rejection of spurious patterns in the data and maximum recognition of the true location of correlation under heavy noise conditions.

Another feature of the invention is that it is inherently compatible with automatic adjustment of the primary and secondary conflict acceptance levels in accordance with varying signal conditions. For example, appropriate feedback signals can increase the primary conflict level if no correlations are obtained in the frame. Conversely, the primary conflict level can be reduced if two or more correlations are detected until only true correlation remains. By way of further example, if no primary correlations are found but two or more secondary correlations noted, the primary conflict level can be decreased and the secondary conflict level increased.

A more thorough understanding of the invention may be obtained by a study of the following detailed description taken in connection with the accompanying drawings in which.

Figure 1:
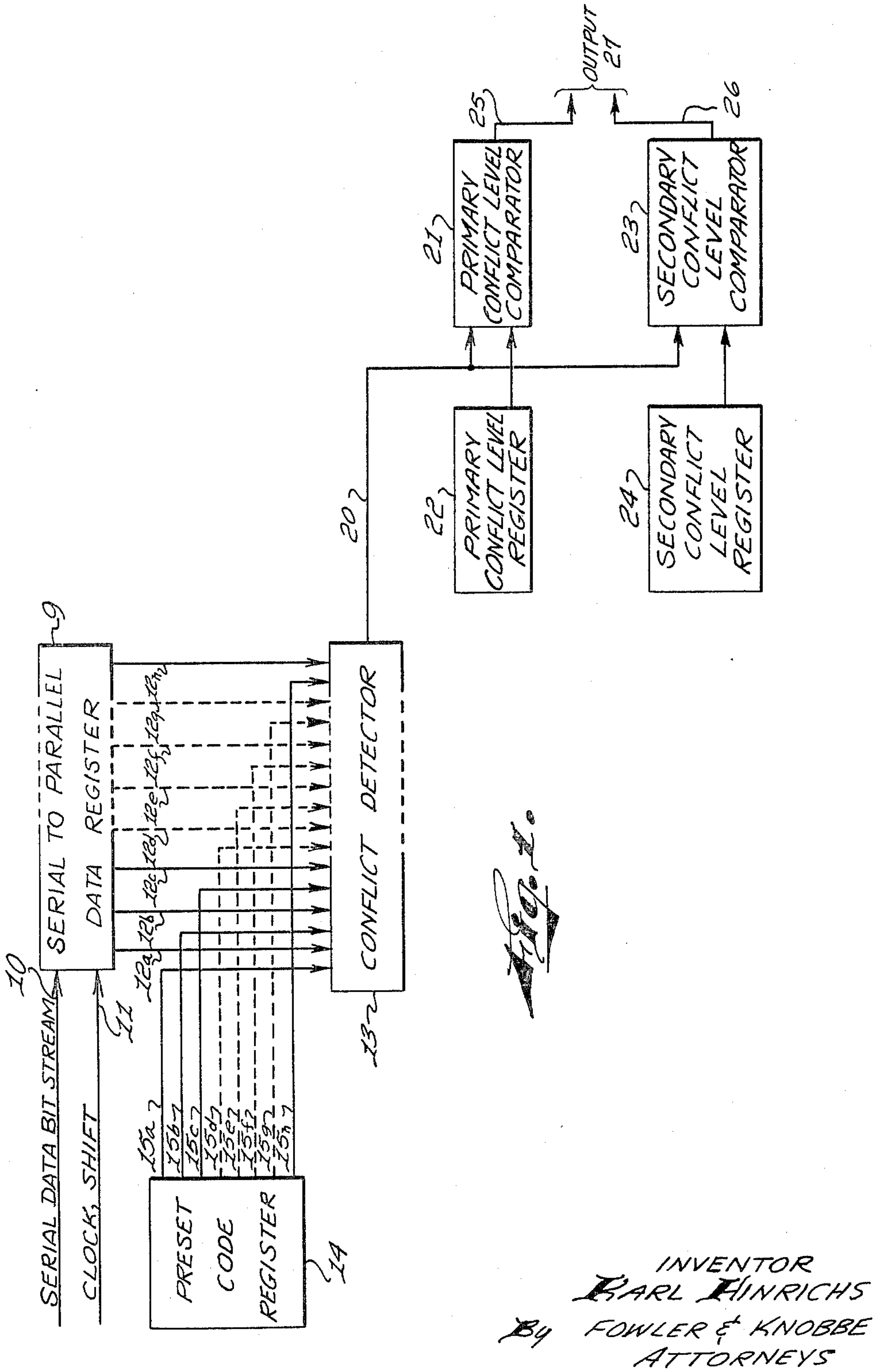
FIG. 1 is a simplified block diagram of a correlator for a serial data bit stream constructed in accordance with the present invention.

The overall structure and operation of the invention for determining the degree of correlation between a preset code of $n$ bits and every $n$ bit group in an incoming data bit stream is illustrated in the simplified block diagram of FIG. 1. Serial to parallel register 9 is responsively connected to the incoming data bit stream 10 and the local clock lead 11. Register 9 converts the binary coded serial input data into equivalent binary coded parallel output data upon output leads 12*a*, 12*b*, 12*c* . . . 12*n* connected to conflict detector 13. The incoming serial data bits are clocked in by the local clock, each clock pulse causing the parallel output data to shift by one bit to the succeeding parallel output lead 12 with the last bit being dropped and a new bit applied upon lead 12*a*. In this manner, each group of $n$ bits in the received serial data bit stream is compared with the coded group of $n$ bits preset within the preset storage register 14.

Preset storage register 14 is connected to conflict detector and summer 13 by respective output leads 15*a*, 15*b*, 15*c* . . . 15*n*. Preset code register 14 registers a group of $n$ bits corresponding to the predetermined code pattern, which group is compared with the output of register 9 in conflict detector 13.

The summer portion of detector and summer 13 provides an output signal upon lead 20 for each bit time indicative of the total number of conflicts between the data registered in the serial to parallel register 9 and the preset code register 14. The primary conflict comparator 21 compares this value with a preset conflict level registered in the primary conflict register 22. The secondary conflict comparator 23 compares this value with a preset conflict level registered in the secondary conflict level register 24. The respective outputs 25, 26 of the primary and secondary conflict comparators supply appropriate binary indications of whether or not the actual conflict level exceeds the respective primary and secondary preset levels. For example, in the following discussion, the output leads 25, 26 indicate binary Zero's when their preset levels are exceeded and binary One's when there is a satisfactory correlation, i.e. the actual conflicts are less than the preset level. With no correlation, therefore, between the code and data bits for both conflict levels, the output 27 in 00; whereas a correlation between the code and data bits for the secondary but not the primary conflict levels provides the output 01, where the first binary digit corresponds to the primary level and the second binary digit corresponds to the secondary level. Similarly, correlation between the code and data bits for both conflict levels provides the output 11.

In use, the primary conflict level is the most stringent acceptance level, this level being selected by the operator or preferably automatically by a feedback signal to give the maximum rejection of correlations in erroneous locations which is permitted by the prevailing noise condition. The secondary level is set at a less stringent level, i.e. one permitting more conflicts. This level is also selected by the operator or preferably automatically to give the most liberal acceptance level permitted by off center correlation history.

In an illustrative example, the primary and secondary levels are set in the above described manner to provide a single output of 11 in each frame under normal noise conditions. In a period of excessive noise, the stringent level of the primary level may well be exceeded. However, the secondary level will continue to indicate a satisfactory correlation so long as its less stringent level setting is not exceeded. The receiver will thereby be maintained in sync by the 01 signal at output 27.

Figure 2:
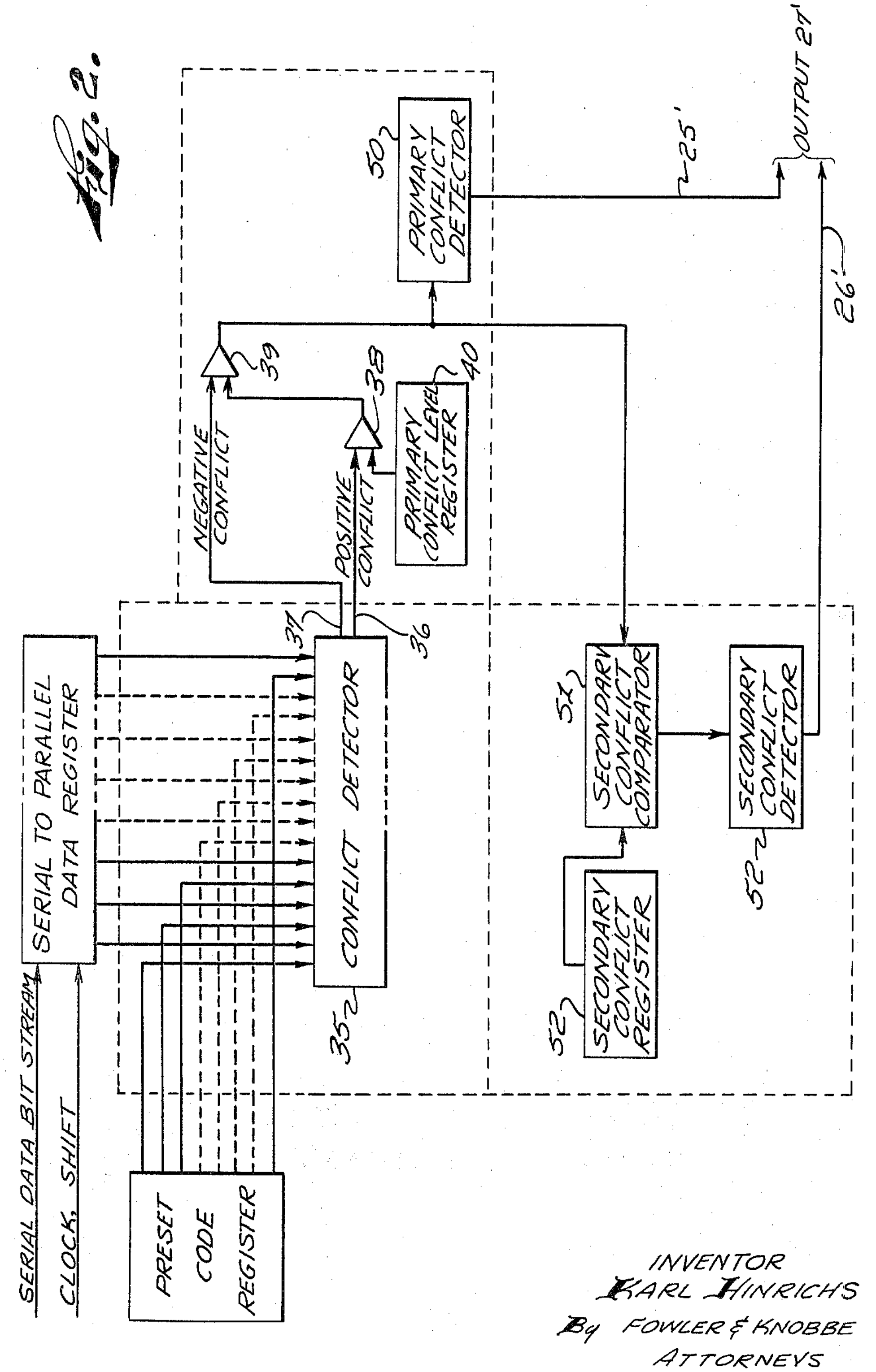
FIG. 2 is a block diagram of a preferred embodiment of the invention.

A preferred embodiment of the invention is illustrated in FIG. 2. The serial to parallel data register 9 and preset code register 14 function in the manner described above to provide respective parallel digital signals into conflict detector 35. Conflict detector 35 includes output leads 36, 37 upon which are supplied signals indicative of the presence or absence of positive and negative conflicts between the data and code bits. In the following description, a positive conflict is one wherein the data bit is a binary One and the code bit is a binary Zero, and a negative conflict one wherein the data bit is a binary Zero and the code bit a binary One. Preferably, the conflict detector provides analog signals on leads 36, 37 having magnitudes proportional in value to the respective number of positive and negative conflicts. The positive conflict signal is applied to summing amplifier 38 and the negative conflict signal is applied to summing amplifier 39. In addition, an analog signal is provided at the output of the primary conflict level register 40 having a magnitude proportional to the primary conflict level and a polarity opposite to the positive conflict signal on lead 36. As a result, these signals are subtracted and the remainder applied to the input of summing amplifier 39 and added to the negative conflict signal. The output of amplifier 39 is therefore an analog signal having a magnitude corresponding to the total number of actual conflicts less the primary conflict level preset in register 40. In the following description, this signal is ground or negative polarity when the primary conflict level is not exceeded, i.e. a satisfactory correlation, and a positive polarity signal when the primary conflict level has been exceeded. This signal is detected by the primary conflict detector 50 which applies to lead 25′ a binary One output for a ground or negative input signal and a binary Zero output for a positive polarity input signal.

The output of summing amplifier 39 is also connected to the input of secondary conflict comparator 51 which compares it with an analog signal having a magnitude proportional to the secondary conflict level supplied by secondary conflict register 52. The output of comparator 51 is detected by the secondary conflict detector 53 which supplies to lead 26′ a binary One output when the secondary conflict level from 24′ exceeds the output of summer 39 and a binary Zero output when the summer 39 output level exceeds the secondary conflict level.

The preferred embodiment of FIG. 2 operates substantially similar to the embodiment of FIG. 1 and supplies the same type of output signals as described hereinabove. One difference is that the conflict level compared with the secondary level represents the actual conflict level less the primary conflict level. Accordingly, the secondary conflict register 52 presets the number of conflicts beyond the primary conflict level preset in register 40.

Figure 3:
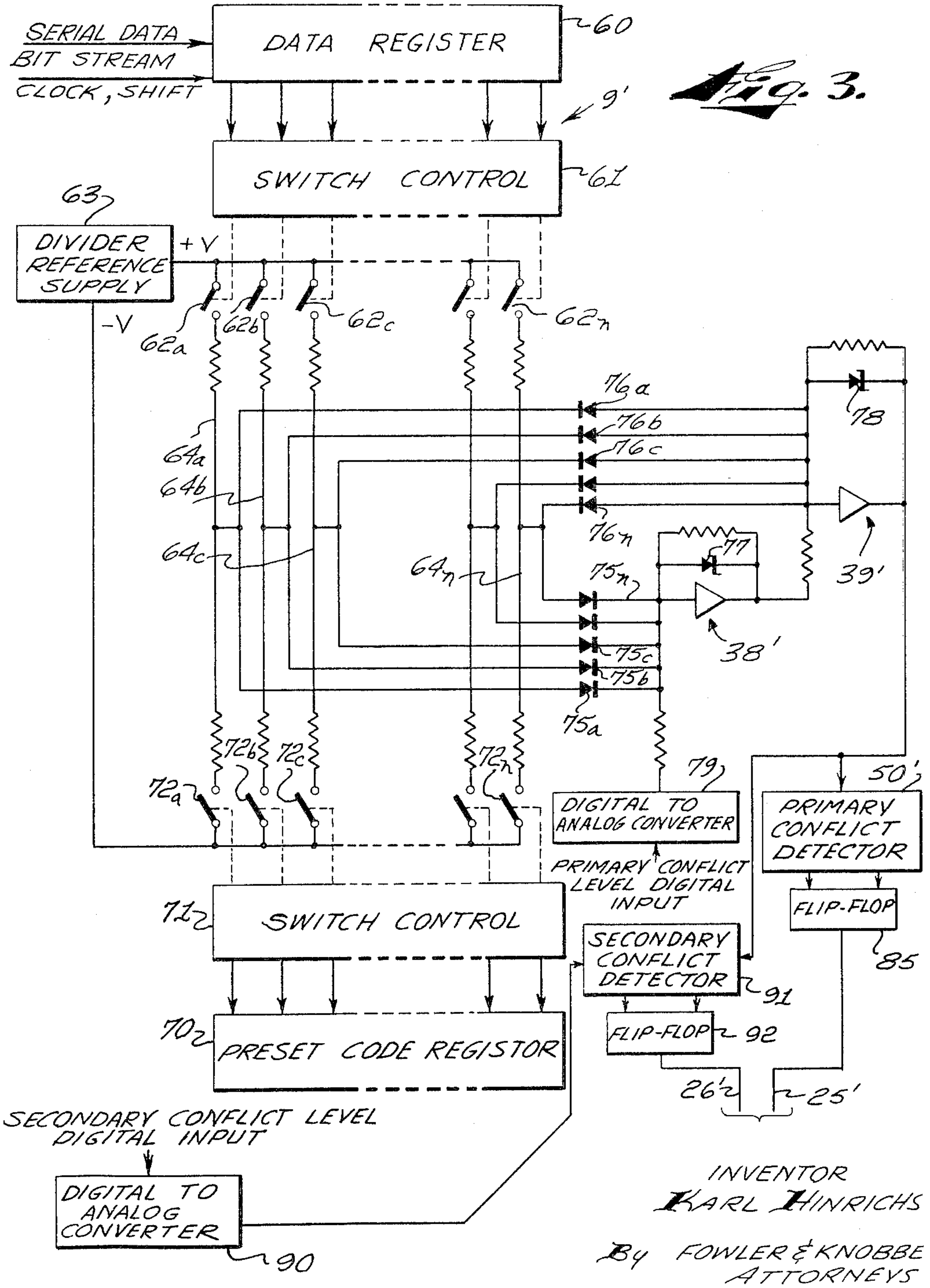
FIG. 3 is a more detailed circuit diagram for the embodiment of FIG. 2.

A more detailed circuit schematic for the correlation system of FIG. 2 is illustrated in FIG. 3. As previously described, the serial data bit stream is clocked into the data register 60 of the serial to parallel converter 9′. Each bit within register 60, if a binary ONE, causes switch control 61 to close a corresponding switch 62*a*, 62*b*, 62*c* . . . 62*n*. The positive terminal of the direct current reference supply 63 is then connected, for the 1 bit positions, to one end of an equal resistance divider 64*a*, 64*b*, 64*c* . . . 64*n*. The other end of this divider is similarly closed to the negative terminal of supply 63 if a binary One exists at the bit position set up in preset code register 70. Register 70 is operatively connected to switch control 71 which closes a corresponding switch 72*a*, 72*b*, 72*c* . . . 72*n* for the 1 bit positions.

The center tap of each divider 64 is diode coupled by oppositely polled diodes 75*a*, 75*b* . . . 75*n* and 76*a*, 76*b* . . . 76*n* to a pair of summing amplifiers 38′, 39′.

Amplifier 38′ receives currents from all of the dividers 64 connected by switches 62 to the positive reference voltage +V. This amplifier is also fed by a current from digital to analog converter 79 corresponding to a preset primary conflict level. This current is opposite in polarity to the currents supplied from the dividers 64; accordingly, the outuut of amplifier 38′ corresponds to the difference between the actual number of positive conflicts and the primary conflict level.

Amplifier 39′ receives currents from all of the dividers 64 connected by switches 72 to the negative reference voltage −V. This amplifier is also fed by a current from summing amplifier 38′. This latter amplifier inverts the currents applied thereto so that the positive output of amplifier 39′ is an analog representation of the total number of positive and negative conflicts at any given bit time less the number of conflicts set by digital to analog converter 79. If the primary conflict level exceeds the total number of conflicts, i.e. if there is a satisfactory correlation, amplifier 39′ will supply a ground or negative output.

Each of the summing amplifier 38′, 39′, are shown with zener feedback provided by respective zener diodes 77, 78. These diodes limit the respective output potentials of these amplifiers to thereby obviate any time delay in determining bit location. These potentials are selected to be above the number of conflicts which will ever be preset in either the primary or secondary conflict level registers. By way of specific example only, the amplifier output may be limited to ten volts representing sixteen conflicts over the primary conflict level.

The polarity of the output potential of amplifier 39′ is detected by the primary conflict detector 50′. By way of specific example, this detector may be a clamped Schmitt trigger operatively driving bistable flip-flop readout 85 for indicating a binary Zero on output lead 25′ when the output of amplifier 39′ is a positive potential and a binary One on output lead 25′ when the output is grounded or a negative potential.

The secondary conflict level is preset within digital to analog converter 90 which provides a negative output which is an analog representation of the secondary conflict level. This output is added to the output of amplifier 39′ in the secondary conflict detector 91. This comparator may also comprise a Schmitt trigger controlling a flip-flop readout 92. Accordingly, a binary One is provided on output lead 26′ if the actual correlation is better (has fewer conflicts) than that set by the sum of both the primary and secondary conflict levels. Otherwise, a binary Zero is provided upon this output lead.

An important feature of the invention is that it is inherently adapted for automatic feedback control. Thus, the digital to analog converters 79, 90 may be adjusted by digital feedback pulses in accordance with frame history. For example, if an output signal 11 or 01 is not achieved during the frame, it is known that neither the primary nor secondary levels provided a correlation. Accordingly, an appropriate pulsed signal will be fed to digital to analog converter 79 for increasing the primary conflict level. Conversely, if plural signals 11 are obtained during the frame, a digital signal is supplied to converter 79 for decreasing the primary conflict level. These procedures can be repeated for each frame until a correlation is found or the false correlation or correlations removed. Another representative mode of operation is one wherein there are two or more 01 correlations. Digital feedback signals are then supplied both analog to digital converters 79, 90 to respectively reduce the primary conflict level and increase the secondary conflict level. Normally, the receipt of an unambiguous frame-sync requires only a few frames of conflict level adjustment, even under very noisy conditions.

Since the correlation levels are not required to be fixed, but instead based upon successful frame history, the sync location can be maintained even under extreme noise. For example, a sync location can be retained unless there is a simultaneous 00 output signal for this location and a 01 or 11 output signal at another sync location within the frame.

Although exemplary embodiments of the invention have been disclosed and discussed, it will be understood that other applications of the invention are possible and that the embodiments disclosed may be subjected to various changes, modifications, and substitutions without necessarily departing from the spirit of the invention.

I claim:

1. In a means for examining each group of $n$ bits in a received bit stream for correlation with a group of $n$ bits corresponding to a predetermined code pattern, means for defining a primary correlation level wherein a preset number of conflicts between the data and code bits is permitted, and means for defining a secondary correlation level wherein a preset number of conflicts above said primary conflict level is permitted.

2. In a means for examining each group of $n$ bits in a received bit stream for correlation with a group of $n$ bits corresponding to a predetermined code pattern, means for setting a primary correlation level wherein a preset number of conflicts between the data and code bits is permitted, said level being that which gives the maximum rejection of correlations in erroneous locations under normal noise conditions, and means for setting a secondary, less stringent correlation level wherein a preset number of conflicts between the data and code bits is permitted, said secondary level being that which gives the maximum recognition of the true location of correlation under heavy noise conditions.

3. A digital data correlator comprising means for registering a group of $n$ bits in an incoming bit stream, means for registering a group of $n$ bits corresponding to a predetermined code pattern, detection means for detecting conflicts between said respective bit groups, means responsive to said detection means for determining if the total conflicts are above a predetermined primary conflict level, and means for determining if the conflicts above said predetermined primary conflict level exceed a predetermined secondary conflict level.

4. The digital correlator defined in claim 3 wherein said means for registering said incoming bit stream comprises a serial to parallel data converter, the respective binary signals applied to the parallel outputs being compared with binary signals upon corresponding parallel outputs of said means for registering said predetermined code pattern.

5. The digital correlator defined in claim 3 wherein said detection means provides a first output signal having a magnitude corresponding to the number of conflicts wherein the data bit is a binary One and the code bit a binary Zero, and a second output signal having a magnitude corresponding to the number of conflicts wherein the data bit is a binary Zero and the code bit a binary One.

6. The digital correlator defined in claim 5 wherein said detection means comprises a plurality of equal resistance dividers having one end selectively connected to a voltage reference of one polarity according to binary One data bits and an opposite end selectively connected to a voltage reference of an opposite polarity according to binary One code bits, and a pair of oppositely poled diodes connected to each divider center tap so that currents of one polarity are supplied indicative of conflicts wherein the data bit is a binary One and the code bit a binary Zero and currents of an opposite polarity are supplied indicative of conflicts wherein the data bit is a binary Zero and the code bit a binary One.

7. The digital correlator defined in claim 6 comprising a first summing amplifier connected to each diode of one polarity for summing all of said currents corresponding to conflicts of one polarity, a second summing amplifier connected to each diode of respectively opposite polarity for summing all of said currents correspnding to conflicts of the opposite polarity, means for providing a current of respectively opposite polarity to one of said summing amplifiers, said current corresponding to the primary conflict level, and means connecting the output of said one summing amplifier to the input of the other summing amplifier.

8. The digital correlator defined in claim 7 comprising zener diodes respectively connected between the input and output of each summing amplifier to limit the respective output potentials of these amplifiers and thereby obviate any time delay in determining bit location.

9. The digital correlator defined in claim 7 comprising first detector means connected to the output of said other summing amplifier for detecting when the currents corresponding to the total number of conflicts exceed the current corresponding to the primary conflict level.

10. The digital correlator defined in claim 9 comprising means for providing a current corresponding to the secondary conflict level, and second detector means responsive to said other summing amplifier for detecting whether the actual conflicts above the primary level exceed said secondary conflict level.

11. The digital correlator defined in claim 10 wherein said first and second detector means are poled to produce respectively opposite binary outputs for indicating actual conflict levels above and below said primary and secondary conflict levels.

12. The digital correlator defined in claim 3 comprising means for producing a signal whose magnitude may be selectively varied at the repetition rate of said incoming bit stream to correspond with the desired primary conflict level.

13. The digital correlator defined in claim 3 comprising means for producing a signal whose magnitude may be selectively varied at the repetition rate of said incoming bit stream to correspond with the desired secondary conflict level.

14. The digital correlator defined in claim 3 comprising first means for producing a signal whose magnitude may be selectively varied at the repetition rate of said incoming bit stream to correspond with the desired primary conflict level, and second means for producing a signal whose magnitude may be selectively varied at the repetition rate of said incoming bit stream to correspond with the desired secondary conflict level.

15. The digital correlator defined in claim 14 wherein said first and second means comprise respective digital to analog converters.

16. A digital data correlator comprising
means for registering a group of $n$ bits in an incoming bit stream,
means for registering a group of $n$ bits corresponding to a predetermined code pattern,
means for determining the number of conflicts between said respective bit groups,
means for presetting a first conflict level,
first means for comparing the number of conflicts with said first preset conflict level,
means for presetting a second conflict level, and
means for comparing the number of conflicts with said second preset conflict level.

17. A digital data correlator comprising
means for registering a group of $n$ bits in an incoming bit stream,
means for registering a group of $n$ bits corresponding to a predetermined code pattern
detection means for detecting conflicts between said respective bit groups,
means responsive to said detection means for determining the correlations above a primary conflict level, and
means responsive to said detection means for determining the correlations above a second, more liberal conflict level.

18. A digital data correlator comprising
means for registering a group of $n$ bits in an incoming bit stream having a very fast repetition rate,
means for registering a group of $n$ bits corresponding to a predetermined code pattern, conflict detection means for determining the number of conflicts between said respective bit groups,
conflict level setting means for producing a signal whose magnitude may be selectively varied at the repetition rate of said incoming bit stream to correspond with a desired conflict level, and
means responsive to said conflict detection means and said conflict level setting means for producing an output indicative of the correlations above said conflict level.

References Cited by the Examiner

UNITED STATES PATENTS

| | | | |
|---|---|---|---|
| 2,752,489 | 6/1956 | Aigrain | 340—146.2 |
| 2,837,732 | 6/1958 | Nelson | 235—177 |
| 2,848,532 | 8/1958 | Weida | 235—177 |
| 2,865,567 | 12/1958 | Booth et al. | 235—177 |
| 2,907,003 | 9/1959 | Hobbs | 235—177 |
| 2,979,695 | 4/1961 | Tyrlick et al. | 340—146.2 |
| 2,994,062 | 7/1961 | Chiapuzio et al. | 340—146.2 |
| 3,000,001 | 9/1961 | Brink | 340—146.2 |
| 3,102,191 | 8/1963 | Chiapuzio et al. | 235—177 |
| 3,102,994 | 9/1963 | Stampler | 340—146.2 |
| 3,137,789 | 6/1964 | Chiapuzio | 235—177 |
| 3,175,187 | 3/1965 | Willyard et al. | 235—177 |
| 3,204,221 | 8/1965 | Sierra | 235—177 |

MALCOM A. MORRISON, *Primary Examiner.*

ROBERT C. BAILEY, *Examiner.*

M. A. LERNER, M. J. SPIVAK, *Assistant Examiners.*